(12) United States Patent
Huber et al.

(10) Patent No.: US 6,616,183 B2
(45) Date of Patent: Sep. 9, 2003

(54) GAS GENERATOR

(75) Inventors: Johann Huber, Rattenkirchen (DE); Wolfram Seebeck, Schönau (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 10/127,911

(22) Filed: Apr. 23, 2002

(65) Prior Publication Data

US 2002/0158454 A1 Oct. 31, 2002

(30) Foreign Application Priority Data

Apr. 25, 2001 (DE) ......................... 201 07 130

(51) Int. Cl.$^7$ ............................... B60R 21/26
(52) U.S. Cl. ..................................... 280/736
(58) Field of Search ......................... 280/736, 737, 280/740, 741, 742

(56) References Cited

U.S. PATENT DOCUMENTS

| 3,882,673 | A | * | 5/1975 | Doin et al. ............... 60/207 |
| 5,033,772 | A |   | 7/1991 | Frantom et al. |
| 5,351,989 | A |   | 10/1994 | Popek et al. |
| 5,360,232 | A | * | 11/1994 | Lowe et al. ............ 280/741 |
| 5,462,307 | A |   | 10/1995 | Webber et al. |
| 6,039,347 | A | * | 3/2000 | Maynard ................ 280/736 |
| 6,170,867 | B1 | * | 1/2001 | Rink et al. .............. 280/736 |
| 6,196,583 | B1 | * | 3/2001 | Ruckdeschel et al. ..... 280/736 |
| 6,231,079 | B1 |   | 5/2001 | Perotto et al. |
| 6,412,814 | B1 | * | 7/2002 | Huber et al. ............. 280/736 |
| 6,481,357 | B1 | * | 11/2002 | Lindner et al. .......... 102/530 |

FOREIGN PATENT DOCUMENTS

DE        19631314 A1      2/1998

* cited by examiner

Primary Examiner—Paul N. Dickson
Assistant Examiner—Faye M. Fleming
(74) Attorney, Agent, or Firm—Tarolli, Sundheim, Covell & Tummino L.L.P.

(57) ABSTRACT

The invention relates to a gas generator comprising a combustion chamber filled with a solid propellant, a supply chamber filled with a fluid and a mixing chamber in which a hot gas generated by combustion of the solid propellant is mixed with the fluid. A combustion chamber wall is provided that has a plurality of outflow openings through which the hot gas escapes. A fluid feed chamber is provided so as to lie, in terms of flow, between the combustion chamber and the mixing chamber, the hot gas passing through the fluid feed chamber. The fluid from the supply chamber flows into the fluid feed chamber and the fluid feed chamber is radially open towards the outflow openings across the entire circumference of each of the outflow openings, so as to direct an annular fluid stream onto the hot gas.

8 Claims, 2 Drawing Sheets

GAS GENERATOR

TECHNICAL FIELD

The invention relates to a gas generator, in particular for a vehicle occupant restraint system.

BACKGROUND OF THE INVENTION

Known gas generators comprise a combustion chamber filled with a solid propellant, a supply chamber filled with a fluid and a mixing chamber in which the hot gas generated when the solid propellant burns is mixed with the fluid, a combustion chamber wall being provided that has a plurality of outflow openings through which the hot gas escapes. Such gas generators have the advantage that the hot gas is mixed with cold fluid in the mixing chamber and the temperatures of the outflowing mixture are relatively low. Moreover, through the admixture of the fluid, a higher volume of outflowing gas can also be produced, which improves the performance of the gas generator. Up until now, the mixing in the mixing chamber is done in that the wall of the mixing chamber has various openings for the fuel and for the fluid, the openings being oriented with respect to each other in such a way that the streams of fuel and fluid meet in the mixing chamber.

BRIEF SUMMARY OF THE INVENTION

The invention provides a gas generator with which the mixing is improved. This is achieved with a gas generator comprising a combustion chamber filled with a solid propellant, a supply chamber filled with a fluid and a mixing chamber in which a hot gas generated upon combustion of the solid propellant is mixed with the fluid. A combustion chamber wall is provided that has a plurality of outflow openings through which the hot gas escapes. A fluid feed chamber is provided so as to lie, in terms of flow, between the combustion chamber and the mixing chamber, the hot gas passing through the fluid feed chamber. The fluid from the supply chamber flows into the fluid feed chamber and the fluid feed chamber is radially open towards the outflow openings across the entire circumference of each of the outflow openings, so as to direct an annular fluid stream onto the hot gas. The fluid feed chamber provides a fluid feed to the hot gas directly downstream of the outflow openings in that the gas stream entrains fluid along its entire outer circumference, so that a mixture of gas and fluid is formed across a large surface.

The fluid feed chamber is delimited, on the side of the combustion chamber having the outflow openings, by the combustion chamber wall and, on the side of the mixing chamber, by a dividing wall to the mixing chamber; i.e. it is disposed immediately between the mixing chamber and the combustion chamber, so that the space requirement for the additional chamber is small and so that it is ensured that the fluid is, in fact, admixed with the hot gas directly downstream of the outflow openings.

Preferably, a flow connection is provided between the fluid feed chamber and the mixing chamber via overflow openings. The overflow openings are oriented concentrically to associated outlet openings, i.e. for each outflow opening, there is provided an overflow opening in the flow direction of the hot gas, so that the stream of hot gas is not deflected but rather can enter the mixing chamber without additional resistance.

If, according to one embodiment, the overflow openings each have a larger cross section—preferably a larger diameter in the case of circular openings—than the associated outflow openings, then this facilitates the admixture of fluid that is entrained by the stream of hot gas. Since a larger volume flow arises as a result of the admixed fluid, the larger overflow openings also provide a larger flow cross section for the volume flow.

The combustion chamber wall and the dividing wall can have a dome-like shape and be situated in a tubular outer housing of the gas generator, a small gap being provided between the combustion chamber wall and the dividing wall. The dome-like shape has the advantage that the outflow or overflow openings can be made at a right angle to the surface of the dome, and these openings are directed towards the outside to the outer housing in order to obtain a flow path that is enlarged with respect to an axial alignment and along which the gas and the fluid can be mixed.

A centric tube that opens into the fluid feed chamber connects the latter with the supply chamber so that, via the tube, the fluid can enter the fluid feed chamber.

DETAILED DESCRIPTION OF THE PREFERRED EMBODIMENT

Figure 1:
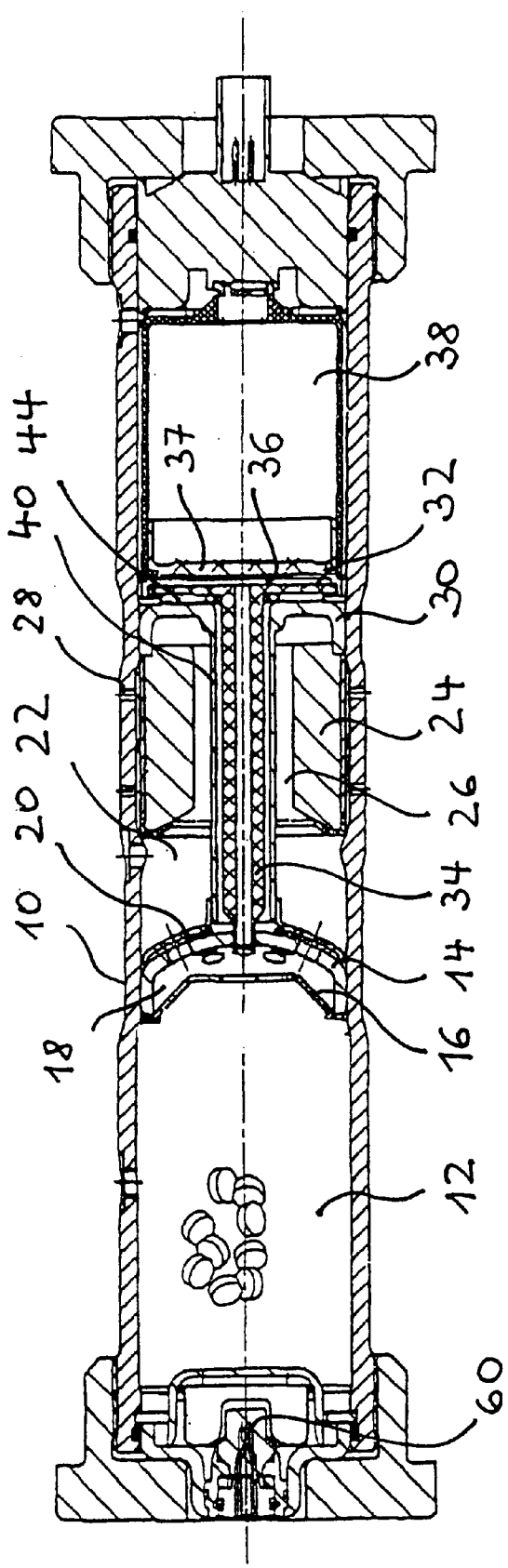
FIG. 1 shows a lengthwise section through an embodiment of a gas generator according to the invention and FIG. 2 shows an enlarged view of the gas generator according to FIG. 1 in the area of the mixing chamber.

FIG. 1 shows a tubular gas generator for inflating a passenger airbag. The gas generator has a tubular outer housing 10 containing numerous chambers. On the left-hand end of the outer housing 10, there is provided a combustion chamber 12 filled with tablet-shaped solid propellant, which ends in a combustion chamber wall 14, the combustion chamber wall 14 having a dome-like shape and being attached in the outer housing 10. An intermediate plate 16 located in the combustion chamber 12 at a slight distance from the combustion chamber wall 14 serves to prevent direct contact of the fuel with the combustion chamber wall 14, so that a compensation space 18 is formed in the combustion chamber.

Figure 2:
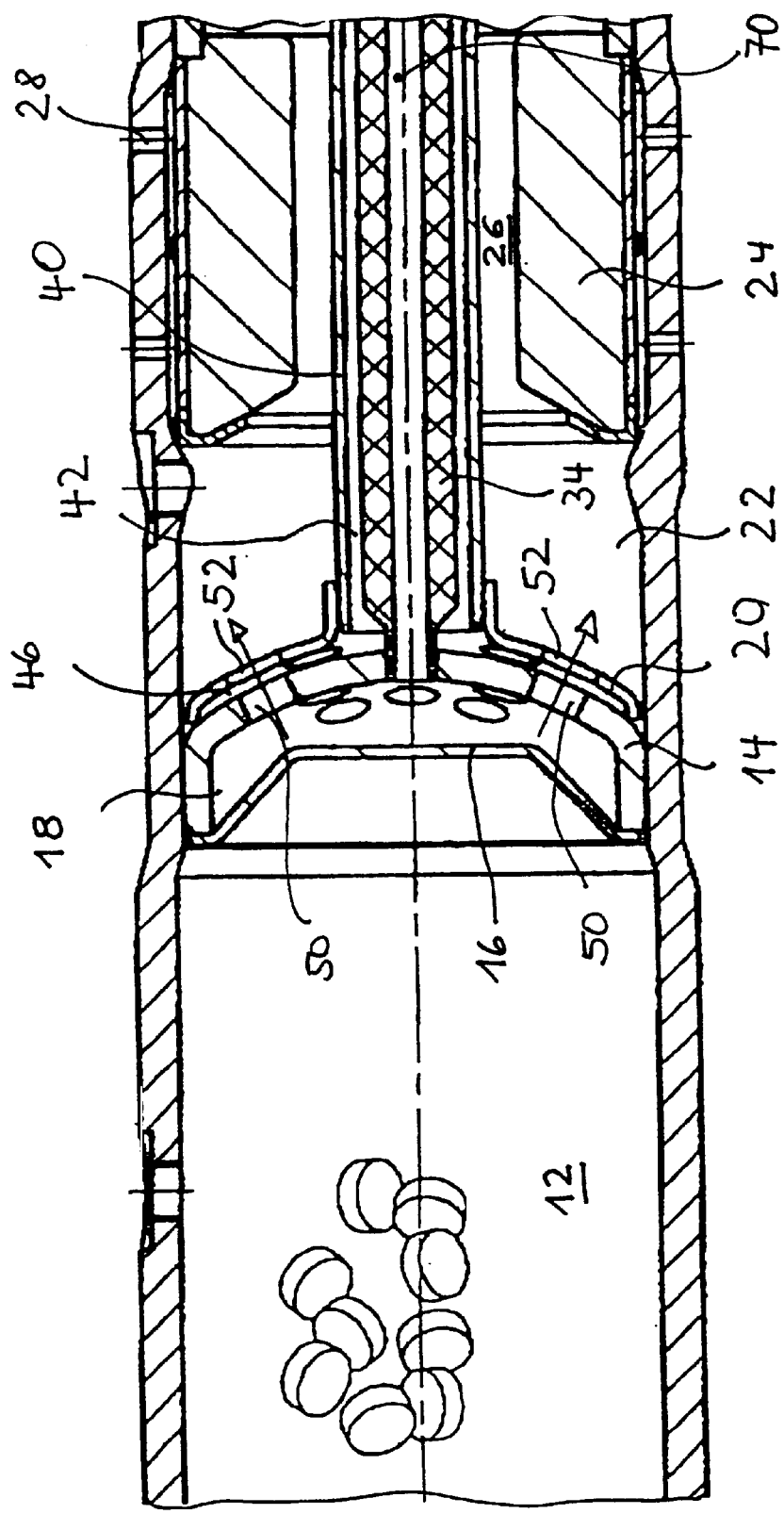

FIG. 2 shows that, at a uniform, slight distance from the combustion chamber wall 14, there is arranged a thin metal plate that forms a dividing wall 20 to a mixing chamber 22. The mixing chamber continues into a filter chamber 26 that is fitted with a filter 24. Radial outflow openings 28 are provided in the area of the filter 24. The filter is followed by an annular wall 30 that is firmly attached to the outer housing 10. A further intermediate wall 32 extends radially and is connected to a centric tube 34 that extends, from a piston chamber 36 that is to the right of the wall 32, all the way through the combustion chamber wall 14, thus connecting the combustion chamber 12 to the piston chamber 36. The piston chamber 36 is delimited on the right by a movable piston 37 that forms the dividing wall to a supply chamber 38 filled with fluid, preferably liquid.

On the wall 30, there is formed on a further centric tube 40 that extends coaxially to the tube 34 but at a distance therefrom, all the way to a projection of the dividing wall 20, to which it is attached. An annular channel 42 is formed between the tubes 34 and 40, the channel connecting a chamber 44 between the walls 30, 32 with a so-called fluid feed chamber 46 between the combustion chamber wall 14 and the dividing wall 20. The fluid feed chamber 46 is very narrow and is arranged so as to create a flow connection between the combustion chamber 12 and the mixing chamber 22.

As can be seen in FIG. 2, the combustion chamber wall 14 has numerous outflow openings 50 that are directed obliquely outwards to the outer housing 10. Each outflow opening 50 has an overflow opening 52 in the dividing wall 20, the overflow opening 52 lying coaxial to the dividing wall 20 and having a larger cross-section than the associated outflow opening 50, preferably a larger diameter, since the outflow openings 50 are circular.

When the gas generator is not yet activated, the combustion chamber 12 and the supply chamber 38 are hermetically sealed.

As soon as an igniter 60 is activated in case of restraint, the fuel in the combustion chamber 12 burns and hot gas is generated that flows partially via the outflow openings 50 through the fluid feed chamber 46, via the overflow openings 52 into the mixing chamber 22, from there into the filter chamber 26, through the filter 24 and through the outflow openings 28 into an airbag (not shown here).

Part of the hot gas, however, enters a channel 70 inside the tube 34 and reaches the piston chamber 36, where it causes the piston 37 to move to the right. As a result of the piston 37 moving to the right, the pressure in the supply chamber 38 is increased, and seals (not shown here) on the edge of the piston 37 break open so that fluid moves along the radially outer edge of the piston 37 and along the piston chamber 36 into the chamber 44. Via the annular channel 42, the fluid is injected into the fluid feed chamber 46. Since the fluid feed chamber 46 is open in the area of the outflow openings 50 radially inwards across the entire circumference, the fluid distributed in the fluid feed chamber 46 can spread around the stream of hot gas out of the outflow openings 50 and is then entrained by the hot gas so as to be even better mixed with the hot gas. Therefore, by means of the fluid feed chamber 46, a closed annular stream of fluid is directed radially at every stream of hot gas.

The admixed liquid evaporates immediately, causing a volume increase and thus an improved performance of the gas generator. Moreover, the admixed liquid brings about a cooling of the hot gas.

The generated mixture leaves the gas generator via the filter chamber 26.

What is claimed is:

1. A gas generator, comprising
   a combustion chamber filled with a solid propellant,
   a supply chamber filled with a fluid,
   a mixing chamber in which a hot gas generated upon combustion of said solid propellant is mixed with said fluid,
   a combustion chamber wall having a plurality of outflow openings through which said hot gas escapes, and
   a fluid feed chamber being provided so as to lie, in terms of flow, between said combustion chamber and said mixing chamber, said hot gas passing through said fluid feed chamber,
   said fluid from said supply chamber flowing into said fluid feed chamber and
   said fluid feed chamber being radially open towards said outflow openings across an entire circumference of each of said outflow openings, so as to direct an annular fluid stream onto said hot gas.

2. The gas generator according to claim 1, wherein a plurality of overflow openings is provided through which a flow connection between said fluid feed chamber and said mixing chamber is established, said overflow openings being oriented concentrically to associated ones of said outflow openings.

3. The gas generator according to claim 2, wherein said overflow openings each have a larger cross-section, and a larger diameter than have said associated outflow openings.

4. A gas generator according to claim 1, wherein a dividing wall is provided and wherein said fluid feed chamber is delimited, on a side of said combustion chamber, by said combustion chamber wall and, on a side of said mixing chamber, by said dividing wall.

5. The gas generator according to claim 4, wherein said combustion chamber wall and said dividing wall have a dome-like shape and are situated in a tubular outer housing of said gas generator, and wherein a small gap is provided between said combustion chamber wall and said dividing wall.

6. The gas generator according to claim 5, wherein a plurality of overflow openings is provided and said outflow openings and said overflow openings are directed obliquely outwards to said outer housing.

7. The gas generator according to claim 6, wherein a centric tube is provided which opens into said fluid feed chamber and connects the fluid feed chamber with said supply chamber.

8. The gas generator according to claim 1, wherein said fluid feed chamber is not in flow connection with said supply chamber when said gas generator is in a non-activated state.

* * * * *